Apr. 10, 1923.

E. J. MOMENEE 1,451,081

HONEYCOMB CANDY CUTTING AND COOLING MACHINE

Filed Aug.10, 1920  3 sheets-sheet 1

Inventor
Edward J. Momenee

By Mason, Fenwick & Lawrence
Attorneys

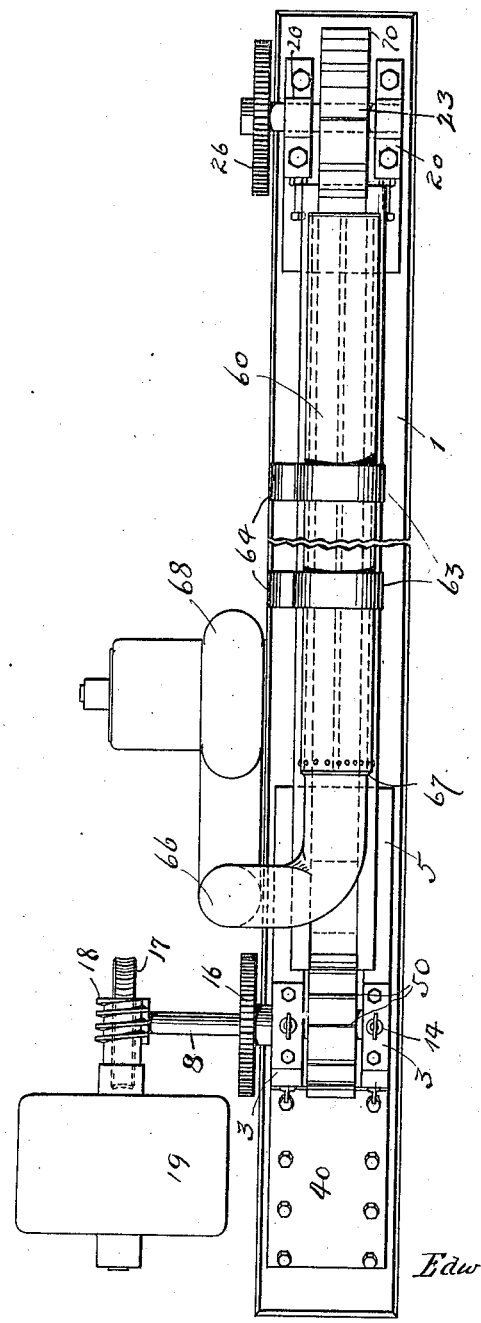

Apr. 10, 1923.
E. J. MOMENEE
1,451,081
HONEYCOMB CANDY CUTTING AND COOLING MACHINE
Filed Aug. 10, 1920     3 sheets-sheet 3
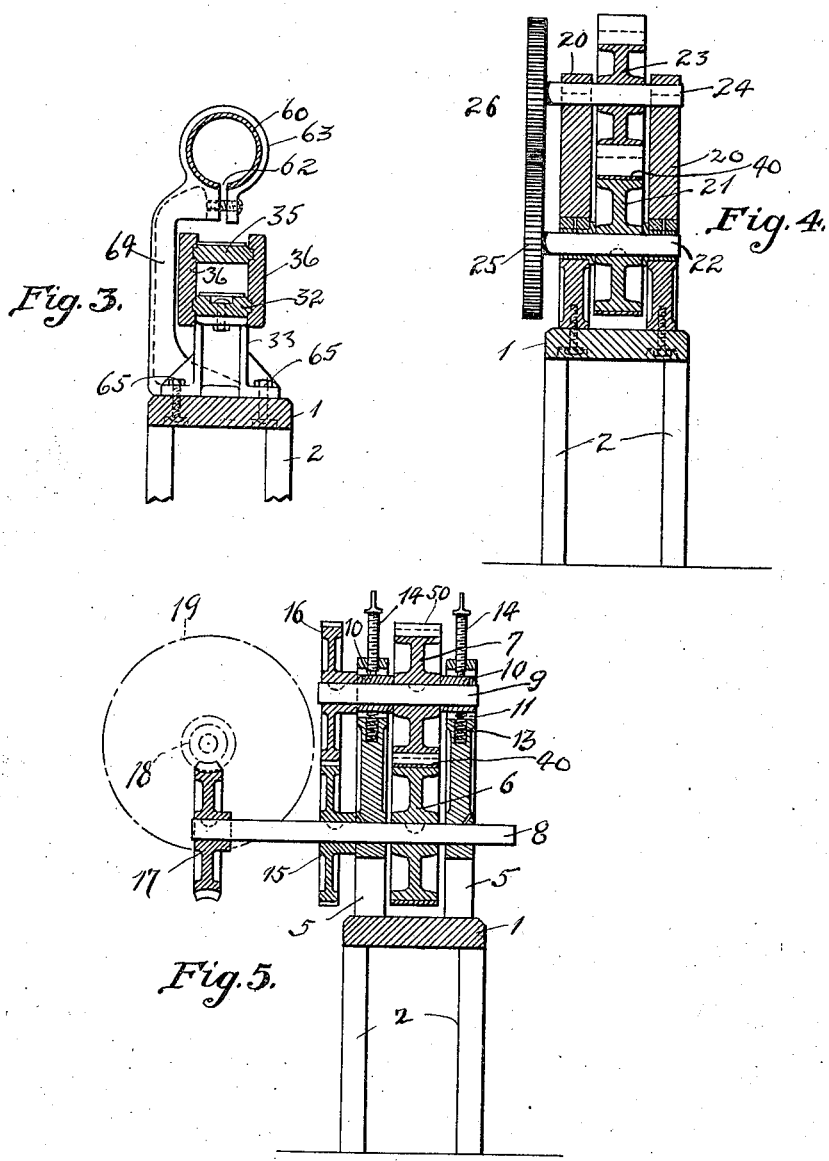
Inventor
Edward J. Momenee,
By Mason Fenwick & Lawrence
Attorneys Patented Apr. 10, 1923.

1,451,081

UNITED STATES PATENT OFFICE.

EDWARD J. MOMENEE, OF LIMA, OHIO.

HONEYCOMB-CANDY CUTTING AND COOLING MACHINE.

Application filed August 10, 1920. Serial No. 402,542.

*To all whom it may concern:*

Be it known that I, EDWARD J. MOMENEE, citizen of the United States, residing at Lima, in the county of Allen and State of Ohio, have invented certain new and useful Improvements in Honeycomb-Candy Cutting and Cooling Machines; and I do hereby declare the following to be a full, clear, and exact description of the invention, such as will enable others skilled in the art to which it appertains to make and use the same.

This invention appertains to the art of candy-making; and more particularly to a machine for cooling and subdividing strips of so called honeycomb candy, which is characterized by the presence of longitudinal, air-filled pores or cavities.

The object of this invention is to subdivide strips of honeycombed candy without compressing it and without permitting the escape of air from the cavities so that small pieces into which the mass is ultimately subdivided retain the porosity characteristic of the mass before it was subdivided.

The invention comprises a machine adapted to convey a long ribbon or strip of freshly worked, soft, porous, air-filled candy beneath a device so operating as to impress creases in the strip at equal intervals, cool the creased strip as it moves from the creasing means so as to render it brittle, and then break the strip into pieces of even length.

It comprises, also, certain subcombinations and details of construction more fully set forth in the accompanying description, illustrated in the drawings and defined in the appended claim.

In the accompanying drawings, identical reference characters designate the same part throughout the several views.

Figure 2 is a plan view of said machine;

Figure 3 is a section on the line 3—3 of Figure 1;

Figure 4 is a section on the line 4—4 of Figure 1;

Figure 5 is a section on the line 5—5 of Figure 1.

Figures 1, 2 and 3 illustrate the motor for operating the candy creasing, carrying and breaking mechanism somewhat diagrammatically. Figures 1 and 2 likewise diagrammatically indicate the position of the blower for delivering an air blast to the marked strip of candy.

Figure 1:
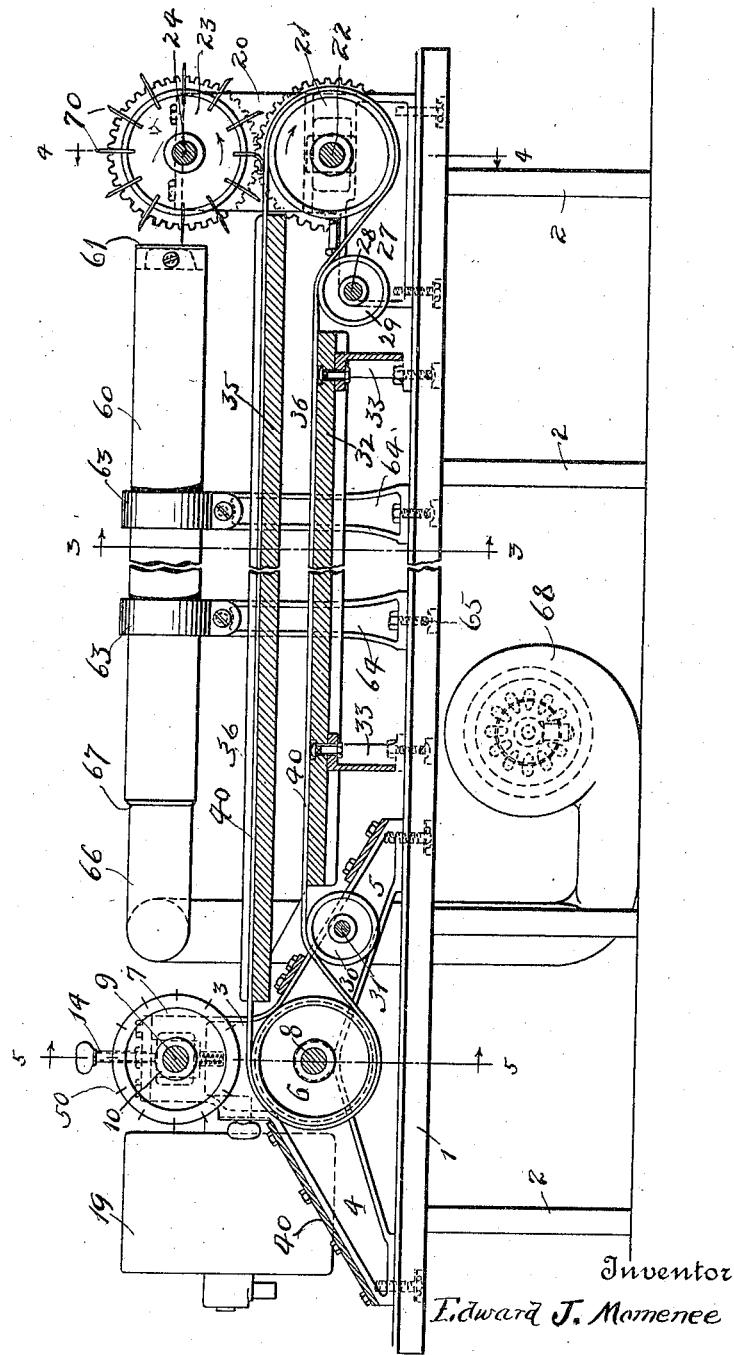
Figure 1 is a view of a machine embodying my invention shown partly in side elevation and partly in longitudinal vertical section.

Honeycomb candy is usually made by forming a hollow cylinder of warm, plastic candy and sealing within it a body of air. This cylinder is then drawn or worked, folded, again drawn or worked, and this operation is repeated until finally when the candy has received sufficient working it consists of a long strip of suitable cross-sectional area for severing into marketable candy, said strip having a large number of small orifices extending throughout its length, filled with air. In the usual practice of subdividing this candy strip into suitable sizes for retail trade, the candy is handled so much and in such manner while it is still soft that it becomes squeezed more or less; when finally subdivided into small pieces the walls of the pores are squeezed together, some of the air is pressed out, and the candy is no longer so light and porous as it was in the completely worked mass. By my invention, the warm, freshly worked strip or ribbon is fed onto a carrier on which it rests by gravity, transverse indentations or creases are impressed in the upper side of the strip or ribbon at equal intervals by a bladed device, without squeezing the body of the candy at any place except where a blade is forced into it at intervals. The blade does not cut or sever the candy but sinks into it, making a transverse impression, displacing the candy on opposite sides, without cutting into or severing the walls of the pores and permitting the air to escape. The candy ribbon is then cooled by a blast of air as the ribbon travels beneath a blower whereby it is made brittle, and when sufficiently cool and brittle, it is broken at the creases by taps imparted by flexible beaters.

In the embodiment illustrated, 1 indicates a narrow beam constituting the bed member of the machine. The bed member 1 may be suitably supported, as shown in the drawings, on legs or pedestals 2, or by any suitable elevating support which rests upon the floor of the factory, or other primary foundation. Mounted on the front end of the bed, as shown at the left of Figure 1, is a shaft housing 3 consisting of similar spaced members having the form, in elevation, of an inverted letter Y, the branches 4 and 5 of which are bolted to the bed 1. Said spaced, inverted Y-shaped members support between them a pulley 6 and a creaser 7, respectively keyed to shafts 8 and 9. The shaft 8 is mounted at the junctions of the arms or branches 4 and 5, and the said shaft 9 is mounted in vertically movable bearings 10 fitted in ways 11 in the upper ends of the members of said housing. A spring 13 in each member exerts its tension to thrust said bearing members 10 upward, while adjusting screws 14 limit the upward movement of the bearings and enable the shaft 9 to be adjusted slightly toward or away from the shaft 8. Upon the shaft 8 outside of the housing, is keyed a spur wheel 15 which meshes with a spur wheel 16, keyed to the shaft 9. The length of the teeth of the spur wheels 15 and 16 is preferably such as to enable said teeth to remain in engagement during the limited adjusting movement of the shaft 9, or the said wheels may be retained in driving position by any of the well known means commonly used for that purpose. On one end of shaft 8, as shown in Figure 5, is keyed a worm wheel 17 which meshes with a driving worm 18, which may be keyed to the armature shaft of a motor 19, although it will obvious that any suitable means for driving the shaft 8 may be adopted without modifying the invention.

Mounted on the end of the bed 1 opposite to that on which the housing 3 is mounted is a second housing 20, also consisting of two spaced members carrying between them a rotary pulley 21 keyed to a shaft 22 journaled in said members and a rotary beater wheel 23 keyed to a shaft 24 mounted at the upper portion of said housing above the shaft 22. Keyed to the ends of the shafts 22 and 24, respectively, are gear wheels 25 and 26, having intermeshing teeth. Although not so shown in the drawing, the beater wheel 23 may be adjustably mounted in the same manner as the creaser 7.

The lower portion of the housing 20 has a pair of projecting members 27 extending toward the housing 3 and carrying a shaft 28, upon which is mounted an idle pulley 29, and a corresponding idle pulley 30 is mounted on a shaft 31 on the member 5 of the housing 3. Spaced above the bed 1 between the housings 3 and 20 is a belt guide 32 sustained on the housing by the pedestals or brackets 33. Spaced above the guide 32 is a belt or apron guide 35, the upper surface thereof being in a plane substantially tangential to the perimeters of the pulleys 6 and 21. Side plates 36 extend from the support 32 to and above the supporting guide 35. An endless conveyer belt or band 40 passes around the pulley 6 and the pulley 21, the upper ply running on the guide 35 between the upper edges of the side plates 36 while its under ply runs on the guide member 32 and is housed between the side plates 36, the upper member 35, and the under support 32. The under ply also passes over the idle pulleys 29 and 30 provided for the purpose of preventing undue wear on the flexible endless conveyer by engagement with the corners on the ends of the guide 32. By this structure the conveyer belt is protected from dust and dirt, is kept at the proper tension and is prevented from interfering with the clothing of the operator.

Bridging the members 4 of the housing 3 is a deck or cover plate 35, the surface of which is substantially tangential to the curve of the endless conveyer belt 40 where it passes around the upper left hand quadrant of the pulley 6, as illustrated in Figure 1. The deck or table 40 serves as an inclined plane up which the candy strip or ribbon being subjected to treatment is drawn from a table, (not shown), forming a substantial extension of the base 1.

The rotary creaser 7, keyed to the shaft 9 that is journaled in the housing 3, is armed with circumferentially spaced blades 50, which describe, in their rotations, a cylindrical path that may be more or less spaced above the upper surface of the endless carrier 40. The spacing may be varied slightly, as hitherto explained, by means of the adjustable bearing 10. It is intended that the creaser 7 shall be interchangeable with others, having knives differently spaced, if desired.

In order to discharge a blast of air lengthwise of and upon the endless conveyer 40 from above, a tubular member 60, having a closed end 61 adjacent the housing 20 and a longitudinal slit 62 in its bottom is arranged directly over the center of the upper ply of the endless conveyer 40 and parallel with it. The tube 60 is held in split clamps 63 on the upper end of curved brackets 64, which are bolted as at 65 to the bed 1. The said brackets project upward from the bed 1, curving rearward of the supports and housing for the endless carrier 40, as indicated in Figure 3. A blower conduit 66 is connected to the open end of the pipe 60, as shown at 67, and communicates with the casing of a blower, shown conventionally at 68, which may be supported at any convenient place adjacent to the machine. When the machine is in operation the blower 68 causes a blast of air to be discharged through the slit 62, in the under side of the pipe 60, on top of the strip or ribbon of candy being moved toward the right or discharge end of the machine by the endless carrier 40.

The cylindrical breaker cylinder 23 is provided with flexible flaps 70 circumferentially spaced in substantial correspondence with the spacing of the blades 50 on the creasing cylinder 7. These flaps 70 may be of leather or other suitable flexible material and are intended to tap the strip or ribbon of candy after it issues from the cooling zone produced by the air blast and is in a cold and brittle state. The flexible beaters 70, lightly tapping the candy, break it in pieces determined by the spacing of the creases or transverse indentations formed in it by the blades 50. Thus the candy is discharged from the machine broken or otherwise subdivided into cold, brittle, light and porous pieces of equal length.

It is intended that the breaker cylinder 23 may be removed and replaced with another breaker cylinder having flaps or breaker blades spaced different distances apart, so that the spacing of the breaker flaps may be made to correspond with the spacing of the creasing blades 50 at the opposite end of the machine. It may be made adjustable, if thought desirable, in the same manner as the creaser cylinder 7.

It will be understood that, in operation, the upper ply of conveyer 40 moves from the creaser cylinder 7 toward the breaker cylinder 23, and that the said creaser and breaker cylinders rotate in a direction opposite the rotation of the conveyer pulleys and at substantially the same angular speed so that the adjacent surfaces of the conveyer, and creaser and breaker cylinders move uniformly in the same direction as indicated by the arrows in Figure 1.

It will be obvious that with this machine honeycomb candy, after having been properly worked and drawn out into ribbons or strips of the desired size, may be laid on a table in substantial alinement with the bed 1 of the machine; the end of a plastic, freshly worked ribbon or strip of candy may be drawn up over the table or deck 40 and its end inserted between the conveyor 40 and the creasing cylinder 7. The surface speed of the blades 50 of the creaser and the conveyor 40 is the same. The candy strip will therefore be transversely creased and carried along, resting by gravity only on the upper ply of the conveyer 40. As the creased ribbon is moved beneath the pipe 60, a blast of air is continuously blown upon it substantially throughout its length or the greater part thereof. By the time the advancing end of the candy ribbon reaches the breaker cylinder or reaches the position where the flexible blades 70 will contact with it during their rotation, the candy has been cooled and creased without having been squeezed bodily and is in a brittle condition, so that the blows of the flaps 70 cannot distort it but cause the candy to break in lengths determined by the creases. It will therefore be seen that by my machine, honeycomb candy may be subdivided into even pieces without impairing its porous or honeycombed structure.

Having described my invention in such manner as to enable those skilled in the art to which it appertains to make and use the same, what I claim and desire to secure by Letters Patent is:

In a machine for making candy of the type described having an endless belt conveyer supported by a pulley which is driven thereby, a breaker wheel carrying a plurality of flexible peripheral flaps, said breaker wheel being mounted perpendicularly above the conveyer driven pulley so that the flaps will only contact the candy while it is still on the flat part of the conveyer and means for driving said breaker wheel from the said driven pulley.

In testimony whereof I affix my signature.

EDWARD J. MOMENEE.